(12) United States Patent
Pethe

(10) Patent No.: US 9,937,687 B2
(45) Date of Patent: Apr. 10, 2018

(54) POLYMER-BASED MULTILAYER GAS BARRIER FILM

(71) Applicant: Entegris, Inc., Billerica, MA (US)

(72) Inventor: Vishwas Vyankatrao Pethe, Shakopee, MN (US)

( * ) Notice: Subject to any disclaimer, the term of this patent is extended or adjusted under 35 U.S.C. 154(b) by 656 days.

(21) Appl. No.: 14/379,101

(22) PCT Filed: Feb. 15, 2013

(86) PCT No.: PCT/US2013/026413
§ 371 (c)(1),
(2) Date: Aug. 15, 2014

(87) PCT Pub. No.: WO2013/123378
PCT Pub. Date: Aug. 22, 2013

(65) Prior Publication Data
US 2015/0024188 A1    Jan. 22, 2015

Related U.S. Application Data

(60) Provisional application No. 61/600,304, filed on Feb. 17, 2012.

(51) Int. Cl.
| | |
|---|---|
| B32B 27/08 | (2006.01) |
| B32B 37/24 | (2006.01) |
| B32B 27/32 | (2006.01) |
| B32B 7/12 | (2006.01) |
| B32B 27/30 | (2006.01) |
| B29C 47/06 | (2006.01) |
| B32B 7/00 | (2006.01) |
| B32B 7/02 | (2006.01) |
| B32B 7/04 | (2006.01) |
| B32B 27/00 | (2006.01) |
| B32B 27/06 | (2006.01) |
| B29C 47/00 | (2006.01) |

(52) U.S. Cl.
CPC ............ *B32B 27/08* (2013.01); *B29C 47/065* (2013.01); *B32B 7/00* (2013.01); *B32B 7/02* (2013.01); *B32B 7/04* (2013.01); *B32B 7/12* (2013.01); *B32B 27/00* (2013.01); *B32B 27/06* (2013.01); *B32B 27/304* (2013.01); *B32B 27/322* (2013.01); *B32B 37/24* (2013.01); *B29C 47/0021* (2013.01); *B32B 2250/00* (2013.01); *B32B 2250/05* (2013.01); *B32B 2250/24* (2013.01); *B32B 2250/246* (2013.01); *B32B 2250/40* (2013.01); *B32B 2270/00* (2013.01); *B32B 2307/714* (2013.01); *B32B 2307/7242* (2013.01); *B32B 2307/7244* (2013.01); *B32B 2307/7246* (2013.01); *B32B 2307/7248* (2013.01); *B32B 2439/00* (2013.01); *B32B 2439/70* (2013.01); *B32B 2439/80* (2013.01); *B32B 2553/00* (2013.01); *Y10T 428/31544* (2015.04)

(58) Field of Classification Search
CPC ........ B32B 27/08; B32B 27/322; B32B 37/24
See application file for complete search history.

(56) References Cited

U.S. PATENT DOCUMENTS

| | | |
|---|---|---|
| 6,592,978 B1 | 7/2003 | Miller et al. |
| 2003/0087053 A1 | 5/2003 | Fukushi |
| 2003/0188826 A1 | 10/2003 | Miller |
| 2006/0137757 A1 | 6/2006 | Mckeen et al. |
| 2006/0235197 A1 | 10/2006 | Alberg |
| 2007/0166497 A1* | 7/2007 | Shimono ................. B32B 27/08 428/36.91 |
| 2008/0061472 A1 | 3/2008 | Kennedy et al. |
| 2008/0261050 A1 | 10/2008 | Hartzel et al. |
| 2009/0212071 A1 | 8/2009 | Tom et al. |
| 2009/0297769 A1 | 12/2009 | Yan et al. |
| 2010/0112815 A1 | 5/2010 | O'Dougherty et al. |
| 2011/0008600 A1 | 1/2011 | Walsh |

FOREIGN PATENT DOCUMENTS

| | | |
|---|---|---|
| JP | 2749513 B2 | 5/1998 |
| JP | 10-202803 A | 8/1998 |
| JP | 2002-83988 A | 3/2002 |

(Continued)

OTHER PUBLICATIONS

Notification of Reasons for Refusal, from JP Application 2014-557826, dated Jan. 10, 2017, 6 pages.
U.S. Appl. No. 61/468,832, filed May 31, 2012, Advanced Technology Materials, Inc.
U.S. Appl. No. 61/525,540, filed May 31, 2012, Advanced Technology Materials, Inc.

*Primary Examiner* — Robert Harlan

(57) ABSTRACT

A polymer-based multilayer film including a combination of desirable properties, such as relatively high chemical resistance and relatively good gas barrier properties. Specifically, in various embodiments, a multilayer film may include at least one layer having relatively high chemical resistance and at least one other layer having relatively good gas barrier properties. In one particular embodiment, the present disclosure relates to a multilayer film structure having a core layer of a fluoropolymer containing chlorine and a fluoropolymer containing chlorine and oxygen and an outer layer operably bonded on one side of the core layer and comprising a perfluorinated fluoropolymer. The core layer may be a blended layer of the fluoropolymer containing chlorine and the fluoropolymer containing chlorine and oxygen, or the core layer may be a sandwiched structure having at least one layer of the fluoropolymer containing chlorine and at least one layer of the fluoropolymer containing chlorine and oxygen.

18 Claims, 1 Drawing Sheet

(56) References Cited

FOREIGN PATENT DOCUMENTS

| | | | |
|---|---|---|---|
| JP | 2002-307624 A | 10/2002 | |
| JP | 2003-341729 | 12/2003 | |
| JP | 2004-074673 | 3/2004 | |
| JP | 2008-014324 * | 1/2008 | ............... B32B 1/08 |
| JP | 2008-14324 A | 1/2008 | |
| KR | 232434 | 9/1999 | |
| KR | 100385555 B1 | 5/2003 | |
| KR | 100438101 B1 | 6/2004 | |
| WO | WO 93/06159 A1 | 4/1993 | |
| WO | WO 2009/076101 A1 | 6/2009 | |
| WO | WO 2011/006146 A2 | 1/2011 | |
| WO | WO 2011/046802 A2 | 4/2011 | |
| WO | WO 2012/051093 A2 | 4/2012 | |
| WO | WO 2012/078977 A2 | 6/2012 | |
| WO | WO 2012/118527 A1 | 9/2012 | |
| WO | 2013/123378 A1 | 8/2013 | |

\* cited by examiner

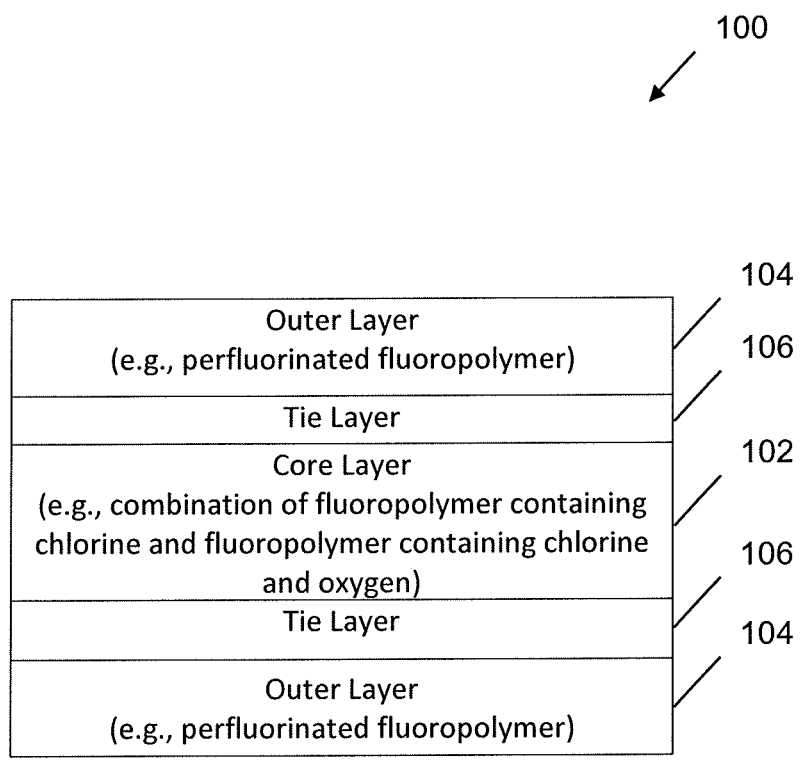

POLYMER-BASED MULTILAYER GAS BARRIER FILM

RELATED APPLICATIONS

This present application is a National Phase entry of PCT Application No. PCT/US2013/026413, filed Feb. 15, 2013, which claims priority to U.S. Provisional Application No. 61/600,304, filed Feb. 17, 2012, the disclosures of which are incorporated by reference in their entirety.

FIELD OF THE INVENTION

The present disclosure relates to polymer-based multilayer gas barrier films. Particularly, the present disclosure relates to polymer-based or fluoropolymer-based multilayer films with relatively good chemical resistance and relatively high gas barrier properties. More particularly, the present disclosure relates to polymer-based or fluoropolymer-based multilayer films with relatively good chemical resistance and relatively high gas barrier properties for use in manufacturing, for example but not limited to, liners for liner-based storage and dispensing systems.

BACKGROUND OF THE INVENTION

Numerous manufacturing processes require the use of ultrapure liquids, such as acids, solvents, bases, photoresists, slurries, cleaning formulations, dopants, inorganic, organic, metalorganic and biological solutions, pharmaceuticals, and radioactive chemicals. Such applications require that the number and size of particles in the ultrapure liquids be minimized. In particular, because ultrapure liquids are used in many aspects of the microelectronic manufacturing process, semiconductor manufacturers have established strict particle concentration specifications for process chemicals and chemical-handling equipment. Such specifications are needed because, should the liquids used during the manufacturing process contain high levels of particles or bubbles, the particles or bubbles may be deposited on solid surfaces of the silicon. This can, in turn, lead to product failure and reduced quality and reliability.

Accordingly, storage, transportation, and dispensing of such ultrapure liquids require containers capable of providing adequate protection for the retained liquids. Collapsible liner-based containers, such as the NOWPak® dispense system marketed by ATMI, Inc., are capable of reducing such air-liquid interfaces by pressurizing, with gas or fluid, onto the liner, as opposed to directly onto the liquid in the container, while dispensing. Specifically, such dispense systems may include an indirect pressure dispense connector including a pressurizing gas inlet that generally permits a gas pressure in-line to be inserted through or coupled with the dispense connector and be in fluid communication with the annular space between the liner and an exterior overpack. In such a system, a pressurizing fluid, gas, or other suitable substance may be introduced into the annular space, causing the liner to collapse away from the overpack wall, thereby pushing the contents of the liner out through a liquid outlet of the indirect pressure dispense connector.

In such pressure dispense applications, gas may permeate or be otherwise undesirably introduced through the liner material, thereby contaminating the retained liquids over time, as the gas will be permitted to go into the solution and undesirably come out into the manufacturing process, e.g., onto a semiconductor wafer as bubbles. Additionally, depending on the contents stored in a liner-based system, the liner may need to be manufactured from a material with high chemical resistance. For example, perfluoroalkoxy (PFA) is a fluoropolymer known to have great chemical resistance to hazardous materials, such as to photoresists. However, use of PFA for a liner material is limited where gas barrier properties are required, such as in indirect pressure dispense applications, described above. Polychlorotrifluoroethylene (PCTFE) is a fluoropolymer known to have reasonably good gas barrier properties. However, PCTFE has relatively poor chemical resistance and poor weldability to itself. Other conventional liners made using polyethelene or nylons similarly provide reasonably good gas barrier properties, but have relatively poor chemical resistance.

Thus, there is a need in the art for polymer-based multilayer gas barrier films, particularly fluoropolymer-based multilayer films with relatively good chemical resistance and relatively high gas barrier properties. More particularly, there is a need for polymer-based or fluoropolymer-based multilayer films with high gas barrier properties for use in manufacturing, for example but not limited to, liners for liner-based storage and dispensing systems. Often the contents of such liners include materials that can be very expensive, for example upwards of about $2,500/L or more. Thus, even a small increase in chemical resistance and/or the ability to decrease the amount of gas permeating into the liner during indirect pressure dispense applications, can be desirable.

BRIEF SUMMARY OF THE INVENTION

The present disclosure, in one embodiment, relates to a multilayer film including a combination of desirable or favorable properties, such as relatively high chemical resistance and relatively good gas barrier properties. Specifically, in various embodiments of the present disclosure, a multilayer film may include at least one layer having relatively high chemical resistance and at least one other layer having relatively good gas barrier properties. More specifically, in various embodiments of the present disclosure, a multilayer film may include at least one outer layer having relatively high chemical resistance and at least one other layer, such as but not limited to an inner layer, having relatively good gas barrier properties.

The present disclosure, in another embodiment, relates to a multilayer film structure having a core layer of a fluoropolymer containing chlorine and a fluoropolymer containing chlorine and oxygen and an outer layer operably bonded on one side of the core layer and comprising a perfluorinated fluoropolymer. In some embodiments, the fluoropolymer containing chlorine may be PCTFE and the fluoropolymer containing chlorine and oxygen may be a PFA modified during polymerization with the addition of PCTFE, such as CPT. The multilayer film structure may also include a second outer layer operably bonded on the opposite side of the core layer and comprising perfluorinated fluoropolymer. In some embodiments, the perfluorinated fluoropolymer of one or both of the outer layers of may be PFA. The core layer may be a blended layer of the fluoropolymer containing chlorine and the fluoropolymer containing chlorine and oxygen, or the core layer may be a sandwiched structure having at least one layer of the fluoropolymer containing chlorine and at least one layer of the fluoropolymer containing chlorine and oxygen. The film structure may be configured such that a flux rate of nitrogen gas permeating therethrough is less than 7 cc/day/m$^2$/atm, and preferably less than 1 cc/day/m$^2$/atm. In some embodiments, about 60% to about 90% of the core layer may be comprised of the fluoropolymer containing chlorine and about 40% to about 10% of the core layer may be comprised of the fluoropolymer containing chlorine and oxygen. Likewise, about 60% to about 90% of the multilayer film may be comprised of the core layer and about 40% to about 10% of the multilayer film may be comprised of the outer layers. The multilayer film structure may have an overall thickness of about 1 mil to about 7 mils.

The present disclosure, in a further embodiment, relates to a method for manufacturing a multilayer film structure of the type described above. The method may include extruding a plurality of film layers to form a core layer having a fluoropolymer containing chlorine and a fluoropolymer containing chlorine and oxygen and an outer layer operably bonded on one side of the core layer and having a perfluorinated fluoropolymer. In one embodiment, the plurality of film layers may be coextruded to form the core layer and the outer layer substantially simultaneously. The fluoropolymer containing chlorine may be PCTFE and/or ethylene chlorotrifluoroethylene (ECTFE). The fluoropolymer containing chlorine and oxygen may be a PFA modified during polymerization with the addition of PCTFE, such as CPT. The perfluorinated fluoropolymer may be PFA and/or fluorinated ethylene propylene (FEP).

The present disclosure, in yet another embodiment, relates to a liner having a multilayer film liner wall. The liner wall includes a core layer having a fluoropolymer containing chlorine and a fluoropolymer containing chlorine and oxygen and an outer layer operably bonded on one side of the core layer and having a perfluorinated fluoropolymer. The liner wall may be configured such that a flux rate of nitrogen gas permeating therethrough is less than 7 cc/day/m$^2$/atm. The core layer may be a blended layer of the fluoropolymer containing chlorine and the fluoropolymer containing chlorine and oxygen, or the core layer may be a sandwiched structure having at least one layer of the fluoropolymer containing chlorine and at least one layer of the fluoropolymer containing chlorine and oxygen.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying FIGURES, in which:

FIG. 1 is a schematic view of a multilayer film in accordance with an embodiment of the present disclosure.

DETAILED DESCRIPTION

The present disclosure relates to novel and advantageous polymer-based multilayer gas barrier films. Particularly, the present disclosure relates to novel and advantageous polymer-based or fluoropolymer-based multilayer films with relatively good chemical resistance and relatively high gas barrier properties, which may be used, for example but not limited to, in manufacturing liners for liner-based storage and dispensing systems.

A multilayer film according to the present disclosure may include a combination of desirable or favorable properties of conventional liner materials, such as relatively high chemical resistance and relatively good gas barrier properties. Specifically, in various embodiments of the present disclosure, a multilayer film may include at least one layer having relatively high chemical resistance and at least one other layer having relatively good gas barrier properties. More specifically, in various embodiments of the present disclosure, a multilayer film may include at least one outer layer having relatively high chemical resistance and at least one other layer, such as but not limited to an inner layer, having relatively good gas barrier properties. In one embodiment, as a base for measurement, the flux rate of nitrogen ($N_2$) gas, which is commonly used in pressure dispense applications, permeating through a multilayer film of the present disclosure may be less than 7 cc/day/m$^2$/atm, and in some cases preferably less than 4 cc/day/m$^2$/atm.

A multilayer film according to the present disclosure may be manufactured by any suitable method. However, in one embodiment, the various embodiments of multilayer films of the present disclosure may be manufactured using extrusion, or coextrusion, processes such that the multiple layers of material may be extruded substantially simultaneously.

As illustrated in FIG. 1, in one embodiment, a multilayer film 100 according to the present disclosure may include a core layer 102 and one or more outer layers 104. The core layer 102 may be designed and manufactured to have relatively good gas barrier properties. As noted above, in some embodiments, the core layer 102 may be designed to have a flux rate of $N_2$ gas permeating through the core layer of less than 7 cc/day/m$^2$/atm, preferably less than 4 cc/day/m$^2$/atm, and more preferably less than 1 cc/day/m$^2$/atm. The one or more outer layers 104 may be designed or selected to have relatively good or high chemical resistance. As such, the multilayer film 100, comprised of a core layer 102 and one or more outer layers 104, includes a combination of desirable or favorable properties of conventional liner materials, such as relatively high chemical resistance and relatively good gas barrier properties.

In one embodiment, the core layer 102 may be a blend of materials or itself may be a multilayer structure of multiple materials, or a combination of both. There may be any suitable number of different materials selected for the core layer 102 and, if manufactured as a multilayer structure rather than a blend, the core layer may have any suitable number of layers. The blended and/or layered core layer materials may be selected from any suitable materials such that the resulting core layer 102 has relatively good, and in some cases relatively high, gas barrier properties, as discussed above. In one particular embodiment, the core layer 102 may comprise a blend and/or layered structure of a fluoropolymer containing chlorine and a fluoropolymer containing chlorine and oxygen. In one embodiment, a suitable fluoropolymer containing chlorine may be, but is not limited to, polychlorotrifluoroethylene (PCTFE). Similarly, a suitable fluoropolymer containing chlorine and oxygen may be, but is not limited to, CPT, which is a modified perfluoroalkoxy (PFA) commercially available from Daikin America, Inc. and generally comprises the addition of PCTFE side chains to a PFA main chain during polymerization, thereby increasing gas and/or liquid barrier properties of standard PFA. However, in the process of making CPT, some of the chemical resistance properties of the PFA are compromised.

While often discussed herein with respect to a blend and/or layered structure of PCTFE and CPT, it is recognized however, that the PCTFE of the core layer 102 may be replaced by other suitable polymers or materials, such as but not limited to, polyvinylidene fluoride (PVDF), ethylene chlorotrifluoroethylene (ECTFE), or liquid crystal polymers (LCP), and the discussion with respect to PCTFE is not meant to be limiting. It is also recognized that PCTFE (or other suitable material) and CPT need not be the only materials forming the core layer 102, and other materials may additionally be introduced without departing from the scope of the present disclosure. For example, in one embodiment, glass fiber could be added to the core layer 102.

The ratio of PCTFE (or other suitable material) to CPT (or other suitable material) for the core layer 102 may be selected as desired for a particular application and/or specification. That is, the core layer may comprise from near 0% up to near 100% PCTFE and accordingly may comprise from near 100% to near 0% CPT, respectively. However, in one particular embodiment, the core layer 102 may comprise about 60% to about 90% PCTFE and about 40% to about 10% CPT. Even more particularly, in one embodiment, the core layer 102 may comprise about 80% PCTFE and about 20% CPT. In general, any range disclosed herein should be interpreted to include not only the explicitly indicated range with specified endpoint values, but also include individual values and sub-ranges within the indicated range. This same principle applies to ranges reciting only one numerical value (such as "less than 7 cc/day/m$^2$/atm"). Furthermore, such an interpretation should apply regardless of the breadth of the range or the characteristics being described.

As PCTFE has a permeability of $N_2$ of about 0.1 cc/day/m$^2$/atm and CPT has a permeability of $N_2$ of about 0.9 cc/day/m$^2$/atm, in one embodiment, a blended core layer comprising PCTFE and CPT may have a resulting permeability of somewhere between about 0.1 and 0.9 cc/day/m$^2$/atm. In an embodiment of the core layer 102 comprising a multilayered structure rather than a blend, it is recognized that the number of layers and/or the thickness of each layer may have an overall effect on the resulting barrier properties of the core layer 102. For example, a multilayer film may generally be formed of several layers of individual films held together, for example, by melt bonding. As the number of layers increases, the effectiveness of the barrier properties may also increase. Similarly, the thickness of each layer can significantly impact the adhesion strength between layers and the overall barrier properties of the multilayer film. Specifically, as the layer thickness's become smaller, the crystals in the individual layered films align better to create a more tortuous or anfractuous path for gas molecules, for example, thereby increasing the overall barrier strength of the multilayer film. In this regard, the core layer 102 may include any suitable number of layers and any suitable thickness for each layer are contemplated, and may in cases, depend on the desired application or specification for the resulting multilayer film 100. In one particular embodiment, the core layer 102 may include up to 4096 layers or more. Even more particularly, in one embodiment, the core layer 102 may include between 3 to 128 layers. Likewise, each individual layer may have a thickness from about 1 nanometer up to several microns, such as but not limited to, about 100 microns.

As noted above, the multilayer film 100 may include one or more outer layers 104. The outer layer material may be selected from any suitable materials such that the outer layer 104 has relatively good, and in some cases relatively high, chemical resistance, as at least one side of the multilayer film, depending on the intended use, may be adjacent hazardous or corrosive chemicals. In one particular embodiment, an outer layer 104 may comprise a perfluorinated fluoropolymer. In yet a further embodiment, a suitable perfluorinated fluoropolymer may be, but is not limited to, PFA. While often discussed herein with respect to PFA, it is recognized however, that the PFA of the outer layer 104 may be replaced by other suitable polymers or materials, such as but not limited to, fluorinated ethylene propylene (FEP) or ethylene tetrafluoroethylene (ETFE), and the discussion with respect to PFA is not meant to be limiting. It is also recognized that PFA (or other suitable material) needs not be the only material forming the outer layer 104, and other materials may additionally be introduced without departing from the scope of the present disclosure.

The multilayer film 100 may have an outer layer 104 on only one side of the core layer 102, or may have an outer layer 104 on each side of the core layer 102. In still further embodiments, each outer layer 104 may itself comprise of a blend of materials or a layered structure of materials, or a combination of both. Similarly, each outer layer 104 need not be comprised of the same material or materials as the other(s).

The ratio of core layer 102 to outer layer(s) 104 for the multilayer film 100 may be selected as desired for a particular application and/or specification. That is, the multilayer film 100 may comprise from near 0% up to near 100% of the core layer 102 and accordingly may comprise from near 100% to near 0% of the outer layer(s) 104, respectively. However, in one particular embodiment, the multilayer film 100 may comprise about 60% to about 90% core layer 102 and about 40% to about 10% outer layer(s) 104. Even more particularly, in one embodiment, the multilayer film 100 may comprise about 80% core layer 102 and about 20% outer layer(s) 104.

In further embodiments of the multilayer film 100, any suitable other layers may be included as desired or as required to, for example but not limited to, meet the intended specifications or provide adhesion between the layers. For example, in an embodiment, the core layer 102 may be comprised of a significant percentage of PCTFE and a low percentage of CPT. As PCTFE may alone not be able to bond or laminate well with CPT or PFA, in some embodiments, it may be desirable or advantageous to include one or more tie layers 106 between the core layer 102 and one or more outer layers 104. A tie layer 106 may be selected from any suitable materials having or able to provide the characteristic, such as but not limited to adhesion, desired. In an embodiment, for example, where the core layer 102 comprises a blend or multilayered structure of PCTFE and CPT and the outer layer(s) 104 comprise PFA, depending on the ratio of PCTFE to CPT of the core layer or the structure of a multilayered PCTFE-CPT core, a tie layer comprising CPT may be desirable or advantageous to help bond the core layer 102 with the outer layer(s) 104.

The various embodiments of multilayer film 100 disclosed herein may be designed or configured to have any suitable thickness, which may depend on the application or specifications desired. Similarly, each of the core layer 102, the outer layer(s) 104, any tie layers 106, or any other layers may be any suitable thickness and may have a different thickness than any other layer, which again may depend on the application or specifications desired. In particular embodiments, the overall multilayered film 100 may be from about 1 to 7 mils thick. Even more particularly, in some embodiments, the overall multilayered film 100 may be from about 3 to 5 mils thick.

As noted above, the various embodiments of polymer-based or fluoropolymer-based multilayer films disclosed herein may be used in manufacturing liners for liner-based storage and dispensing systems. Specifically, the various embodiments of polymer-based or fluoropolymer-based multilayer films disclosed herein may be used in manufacturing liners for liner-based storage and dispensing systems, in which indirect pressure or pressure-assisted dispense systems or techniques are employed, in order to protect the contents within the liner from the permeation of the pressure dispense gas applied to the external surface of the liner. However, such example uses are non-limiting and it is recognized that the various embodiments of polymer-based or fluoropolymer-based multilayer films disclosed herein may be used for any suitable purpose, including for the manufacture of any other suitable polymer-based or fluoropolymer-based article.

The liners manufactured using the various embodiments of polymer-based or fluoropolymer-based multilayer films disclosed herein may be any suitable type or configuration, size, and shape liner, including but not limited to, those liners often referred to as pillow-type liners (or two-dimensional liners), three-dimensional or conformal liners, which may be generally configured to more substantially or even significantly conform or fit to an interior of a more rigid overpack defined by the overpack wall, and blow-molded liners, including but not limited to, extrusion blow-mold liners, injection blow-molded liners, and stretch blow-molded liners, which may further employ co-blow-molding (e.g., two preforms blow-molded together) or dual-blow molding (e.g., a preform blow-molded directly into an outer liner or overpack rather than a mold) techniques.

Various suitable example liners and methods for their manufacture are further described in extensive detail in: International PCT Appl. No. PCT/US11/55558, titled, "Substantially Rigid Collapsible Liner, Container and/or Liner for Replacing Glass Bottles, and Enhanced Flexible Liners," filed Oct. 10, 2011; International PCT Appl. No. PCT/US11/55560, titled, "Nested Blow Molded Liner and Overpack and Methods of Making Same," filed Oct. 10, 2011; International PCT Appl. No. PCT/US11/64141, titled "Generally Cylindrically-Shaped Liner for Use in Pressure Dispense Systems and Methods of Manufacturing the Same," filed Dec. 9, 2011; U.S. Prov. Appl. No. 61/468,832, titled "Liner-Based Dispenser," filed Mar. 29, 2011; U.S. Prov. Appl. No. 61/525,540, titled "Liner-Based Dispensing Systems," filed Aug. 19, 2011; U.S. patent application Ser. No. 11/915,996, titled "Fluid Storage and Dispensing Systems and Processes," filed Jun. 5, 2006; International PCT Appl. No. PCT/US10/51786, titled "Material Storage and Dispensing System and Method With Degassing Assembly," filed Oct. 7, 2010, International PCT Appl. No. PCT/US10/41629, U.S. Pat. No. 7,335,721, U.S. patent application Ser. No. 11/912,629, U.S. patent application Ser. No. 12/302,287, and International PCT Appl. No. PCT/US08/85264, each of which is hereby incorporated by reference herein in its entirety. A liner according to the present disclosure may include any of the embodiments, features, and/or enhancements disclosed in any of the above noted applications, including, but not limited to, flexible, rigid collapsible, 2-dimensional, 3-dimensional, welded, molded, gusseted, and/or non-gusseted liners, and/or liners that contain folds and/or liners that comprise methods for limiting or eliminating choke-off and liners sold under the brand name NOWpak® by ATMI, Inc. for example. In further embodiments, a liner-based system according to the present disclosure may be configured such that it is compatible with the NOWPak® pressure dispense system, such as that disclosed in U.S. patent application Ser. No. 11/915,996, titled "Fluid Storage and Dispensing Systems and Processes," which was filed Jun. 5, 2006, the contents of which are hereby incorporated by reference in their entirety herein.

Example uses of such liners may include transporting, storing, and/or dispensing such materials as, but not limited to: ultrapure chemicals or materials, such as acids, solvents, bases, photoresists, bump resists, slurries, detergents, cleaning formulations, dopants, inorganic, organic, metalorganics, TEOS, and biological solutions, DNA and RNA solvents and reagents, pharmaceuticals, printable electronics inorganic and organic materials, lithium ion or other battery type electrolytes, nanomaterials (including for example, fullerenes, inorganic nanoparticles, sol-gels, and other ceramics), TARC/BARC (Top-Side Anti-Reflective Coating/Bottom-Side Anti-Reflective Coating), radioactive chemicals, and low weight ketones and/or copper chemicals for use in such industries as microelectronic manufacturing, semiconductor manufacturing, and flat panel display manufacturing; pesticides/fertilizers; paints/glosses/solvents/coating-materials etc.; power washing fluids; lubricants for use in the automobile or aviation industry, for example; food products, such as but not limited to, condiments, cooking oils, and soft drinks, for example; reagents or other materials for use in the biomedical or research industry; hazardous materials used by the military, for example; polyurethanes; agrochemicals; industrial chemicals; cosmetic chemicals; petroleum and lubricants; sealants; health and oral hygiene products and toiletry products; or any other material that may be dispensed by pressure dispense, for example. Those skilled in the art will recognize the benefits of such liner-based systems and the process of manufacturing the liners, and therefore will recognize the suitability of the liners for use in various industries and for the transportation and dispense of various products.

Because embodiments of liner-based systems of the present disclosure may be used to store, transport, and/or dispense ultrapure, and/or relatively expensive, and in some cases extremely expensive materials, a liner manufactured from any embodiment of the polymer-based or fluoropolymer-based multilayer films of the present disclosure may provide significant advantages over conventional liners, as such embodiments may provide a highly effective gas barrier, as discussed above, during indirect pressure dispense applications for prohibiting or substantially prohibiting the pressure gas from permeating through the liner into the contents of the liner while maintaining high chemical resistance to the particular contents, such as photoresists, that may be stored therein. For example, some ultrapure materials contemplated for use with the liner-based systems of the present disclosure can cost upwards of about \$2,500/L or more. Thus, even a small reduction of the amount of gas permeated into the contents can be desirable.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the present disclosure as determined by the appended claims when interpreted in accordance with the breadth they are fairly, legally, and equitably entitled.

I claim:

1. A multilayer film structure comprising:
    a core layer comprising a blend of a fluoropolymer containing chlorine and a fluoropolymer containing chlorine and oxygen; and
    an outer layer operably bonded on one side of the core layer and comprising a perfluorinated fluoropolymer.

2. The multilayer film structure of claim 1, wherein the fluoropolymer containing chlorine comprises polychlorotrifluoroethlene (PCTFE).

3. The multilayer film structure of claim 2, wherein the fluoropolymer containing chlorine and oxygen comprises perfluoroalkoxy (PFA) modified during polymerization with the addition of PCTFE.

4. The multilayer film structure of claim 1, further comprising a second outer layer operably bonded on the opposite side of the core layer and comprising perfluorinated fluoropolymer.

5. The multilayer film structure of claim 4, wherein the perfluorinated fluoropolymer of at least one of the outer layers comprises perfluoroalkoxy (PFA).

6. The multilayer film structure of claim 4, wherein the perfluorinated fluoropolymer of the other of the outer layers also comprises PFA.

7. The multilayer film structure of claim 1, wherein the core layer comprises at least one layer of the fluoropolymer containing chlorine and at least one layer of the fluoropolymer containing chlorine and oxygen.

8. The multilayer film structure of claim 1, further comprising a flux rate of nitrogen gas permeating therethrough of less than 7 cc/day/m²/arm.

9. The multilayer film structure of claim 8, further comprising a flux rate of nitrogen gas permeating therethrough of less than 1 cc/day/m²/atm.

10. The multilayer film structure of claim 1, wherein the about 60% to about 90% of the core layer is comprised of the fluoropolymer containing chlorine and about 40% to about 10% of the core layer is comprised of the fluoropolymer containing chlorine and oxygen.

11. The multilayer film structure of claim 4, wherein about 60% to about 90% of the multilayer film is comprised of the core layer and about 40% to about 10% of the multilayer film is comprised of the outer layers.

12. The multilayer film structure of claim 1, further comprising a thickness of about 1 mil to about 7 mils.

13. A method for manufacturing a multilayer film structure, the method comprising extruding a plurality of film layers to form a core layer comprising a fluoropolymer containing chlorine and a fluoropolymer containing chlorine and oxygen and an outer layer operably bonded on one side of the core layer and comprising a perfluorinated fluoropolymer.

14. The method of claim 13, wherein the plurality of film layers are coextruded to form the core layer and the outer layer substantially simultaneously.

15. The method of claim 13, wherein the fluoropolymer containing chlorine comprises at least one of polychlorotrifluoroethylene (PCTFE) and ethylene chlorotrifluoroethylene (ECTFE), wherein the fluoropolymer containing chlorine and oxygen comprises perfluoroalkoxy (PFA) modified during polymerization with the addition of PCTFE, and
    the perfluorinated fluoropolynier comprises at least one of perfluoroalkoxy (PFA) and fluorinated ethylene propylene (FEP).

16. A liner having a multilayer film liner wall comprising:
    a core layer comprising a blend of a fluoropolymer containing chlorine and a fluoropolymer containing chlorine and oxygen; and
    an outer layer operably bonded on one side of the core layer and comprising a perfluorinated fluoropolymer.

17. The liner of claim 16, wherein a flux rate of nitrogen gas permeating through the liner wall is less than 1 cc/day/m²/arm.

18. The liner of claim 16, wherein the core layer comprises at least one layer of the fluoropolymer containing chlorine and at least one layer of the fluoropolymer containing chlorine and oxygen.

* * * * *